United States Patent
Sugawara et al.

(10) Patent No.: US 11,769,469 B2
(45) Date of Patent: Sep. 26, 2023

(54) IMAGE PROCESSING APPARATUS, DISPLAY IMAGE GENERATING METHOD, AND FONT DATA STRUCTURE

(71) Applicant: Sony Interactive Entertainment Inc., Tokyo (JP)

(72) Inventors: Akihiko Sugawara, Kanagawa (JP); Akio Ohba, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 567 days.

(21) Appl. No.: 16/966,076

(22) PCT Filed: Feb. 13, 2018

(86) PCT No.: PCT/JP2018/004930
§ 371 (c)(1),
(2) Date: Jul. 30, 2020

(87) PCT Pub. No.: WO2019/159239
PCT Pub. Date: Aug. 22, 2019

(65) Prior Publication Data
US 2021/0035530 A1 Feb. 4, 2021

(51) Int. Cl.
*G06T 11/60* (2006.01)
*G09G 5/28* (2006.01)
(Continued)

(52) U.S. Cl.
CPC .......... *G09G 5/28* (2013.01); *G06T 11/60* (2013.01); *G09G 5/222* (2013.01); *G09G 5/32* (2013.01);
(Continued)

(58) Field of Classification Search
None
See application file for complete search history.

(56) References Cited

U.S. PATENT DOCUMENTS 8,094,122 B2 * 1/2012 Molander ............... G06F 3/013
345/157
9,418,161 B2 8/2016 Ohashi
(Continued)

FOREIGN PATENT DOCUMENTS

| JP | 2002268616 A | 9/2002 |
|---|---|---|
| JP | 2004177720 A | 6/2004 |

(Continued)

OTHER PUBLICATIONS

Toshiyuki Masui, "Pixel Doubler" Collection of Interaction '99 Lecture Papers, Information Processing Society of Japan, 5 pages, Mar. 1999.

(Continued)

*Primary Examiner* — Joni Hsu
(74) *Attorney, Agent, or Firm* — Matthew B. Dernier, Esq.

(57) ABSTRACT

Content data of a display target is acquired in accordance with a user's operations and is used to determine a configuration of a display image. Of the regions to be rendered using fonts in the display image, the region in which a character is to be displaced by a very small amount is determined. The characters targeted for displacement are rendered while being displaced over time in accordance with predetermined displacement rules. The characters not targeted for displacement are rendered in a reference position. With all characters rendered, the display image is completed and output. The processes of S12 to S24 are repeated until display is terminated.

10 Claims, 11 Drawing Sheets

(51) Int. Cl.
   *G09G 5/22*   (2006.01)
   *G09G 5/32*   (2006.01)
(52) U.S. Cl.
   CPC . *G09G 2340/0464* (2013.01); *G09G 2354/00* (2013.01)

(56)     References Cited

U.S. PATENT DOCUMENTS

| | | | | |
|---|---|---|---|---|
| 2006/0279432 | A1* | 12/2006 | Mori | G01C 21/26 340/995.15 |
| 2012/0096344 | A1* | 4/2012 | Ho | G06F 16/9577 715/249 |
| 2012/0311436 | A1* | 12/2012 | Steele | G06F 40/106 715/246 |
| 2014/0164423 | A1 | 6/2014 | Ohashi | |
| 2018/0018305 | A1* | 1/2018 | Hassan | G06F 40/189 |

FOREIGN PATENT DOCUMENTS

| | | |
|---|---|---|
| JP | 2006337771 A | 12/2006 |
| JP | 2010008598 A | 1/2010 |
| JP | 2013037570 A | 2/2013 |
| JP | 2015158524 A | 9/2015 |
| JP | 2017199058 A | 11/2017 |
| JP | 2017227716 A | 12/2017 |

OTHER PUBLICATIONS

International Search Report for corresponding PCT Application No. PCT/JP2018/004930, 4 pages, dated Apr. 24, 2018.
Decision for Refusal for corresponding JP Application No. 2019-571844, 5 pages, dated Jun. 10, 2021.
International Preliminary Report on Patentability and Written Opinion for corresponding PCT Application No. PCT/JP2018/004930, 13 pages, dated Aug. 27, 2020.

* cited by examiner (a)  (b)

| IDENTIFICATION INFORMATION | FONT SHAPE | DISPLACEMENT RULES | |
|---|---|---|---|
| | | VELOCITY | DIRECTION |
| A | A (IMAGE) | 0.5 PIXELS/FRAME | 30° |
| B | B (IMAGE) | 0.2 PIXELS/FRAME | 0° |
| C | C (IMAGE) | – | – |
| ... | ... | ... | ... |

110

(a)　　　　　　　　(b)

250a

250b

250c

250d

250f

250g

250e

250h

250i

IMAGE PROCESSING APPARATUS, DISPLAY IMAGE GENERATING METHOD, AND FONT DATA STRUCTURE

TECHNICAL FIELD

The present invention relates to an image processing apparatus and a display image generating method for displaying images of content, as well as to a data structure of fonts for use therewith.

BACKGROUND ART

In recent years, image display techniques have continued to progress, making it easy to check information and enjoy content such as games and videos in various situations and on diverse platforms such as mobile terminals, tablets, television receivers, personal computers, and wearable display devices. In particular, high-resolution display apparatuses have been implemented to offer high-definition image-viewing experience in familiar settings. Further, there have been proposed techniques using the time integration capability of human visual perception and aimed at successively displaying images with thinned-out pixels during image movement. The result is that the images are perceived with a resolution higher than that of the display apparatus (e.g., see PTL 1 and NPL 1).

CITATION LIST

Patent Literature

[PTL 1] Japanese Patent Laid-open No. 2006-337771

Non Patent Literature

[NPL 1] "Pixel Doubler," Toshiyuki Masui, Collection of Interaction '99 Lecture Papers, Information Processing Society of Japan, March 1999

SUMMARY

Technical Problem

Given various types of display apparatuses and diverse scenes in which they are used, the same source image is desired to be displayed appropriately under such disparate circumstances. For example, there may be cases where character information offering high visibility upon display on a large-screen display apparatus is displayed on a wristwatch type wearable terminal or a mobile phone. In these cases, the characters may be reduced in size or the information displayed at one time may be reduced in amount. In any case, the visibility of what is displayed is worsened. When a character is reduced in size, the number of pixels on a display screen presenting the character is diminished. This can lead to the character becoming illegible because the lines constituting the character appear connected with one another or the contour of the character appearing jagged, which further deteriorates character visibility.

The present invention has been made in view of the above circumstances and provides, as an object thereof, a technology for ensuring visibility regardless of changes in the resolution of the display apparatus as well as in the size of image to be displayed thereon.

Solution to Problem

One embodiment of the present invention relates to an image processing apparatus. This image processing apparatus includes a storage section configured to store data associating data of a source image to be displayed in a display image with predetermined displacement rules for the source image with respect to a display image plane, a displacement controlling section configured to displace the source image in accordance with the displacement rules, before determining a pixel value of the display image on the basis of positional relations between the source image and the display image plane, and an output section configured to output data of the display image of which the pixel value is determined.

Another embodiment of the present invention relates to a display image generating method. This display image generating method includes the steps of reading out data for generating a display image from a memory that stores data associating data of a source image with predetermined displacement rules for the source image with respect to a display image plane, displacing the source image in accordance with the displacement rules, before determining a pixel value of the display image on the basis of positional relations between the source image and the display image plane, and outputting data of the display image of which the pixel value is determined.

A further embodiment of the present invention relates to a font data structure. In this font data structure, data representing the shape of a character is associated with displacement rules referenced by an image processing apparatus for displacing the character on a display image plane when representing the character in the display image, with regard to each character.

Incidentally, if other combinations of the above-outlined composing elements or the above expressions of the present invention are converted between different forms such as methods and apparatuses, they still constitute effective embodiments of the present invention.

Advantageous Effect of Invention

According to the present invention, visibility is ensured regardless of changes in the resolution of the display apparatus as well as in the size of the image to be displayed thereon.

DESCRIPTION OF EMBODIMENT

Figure 1:
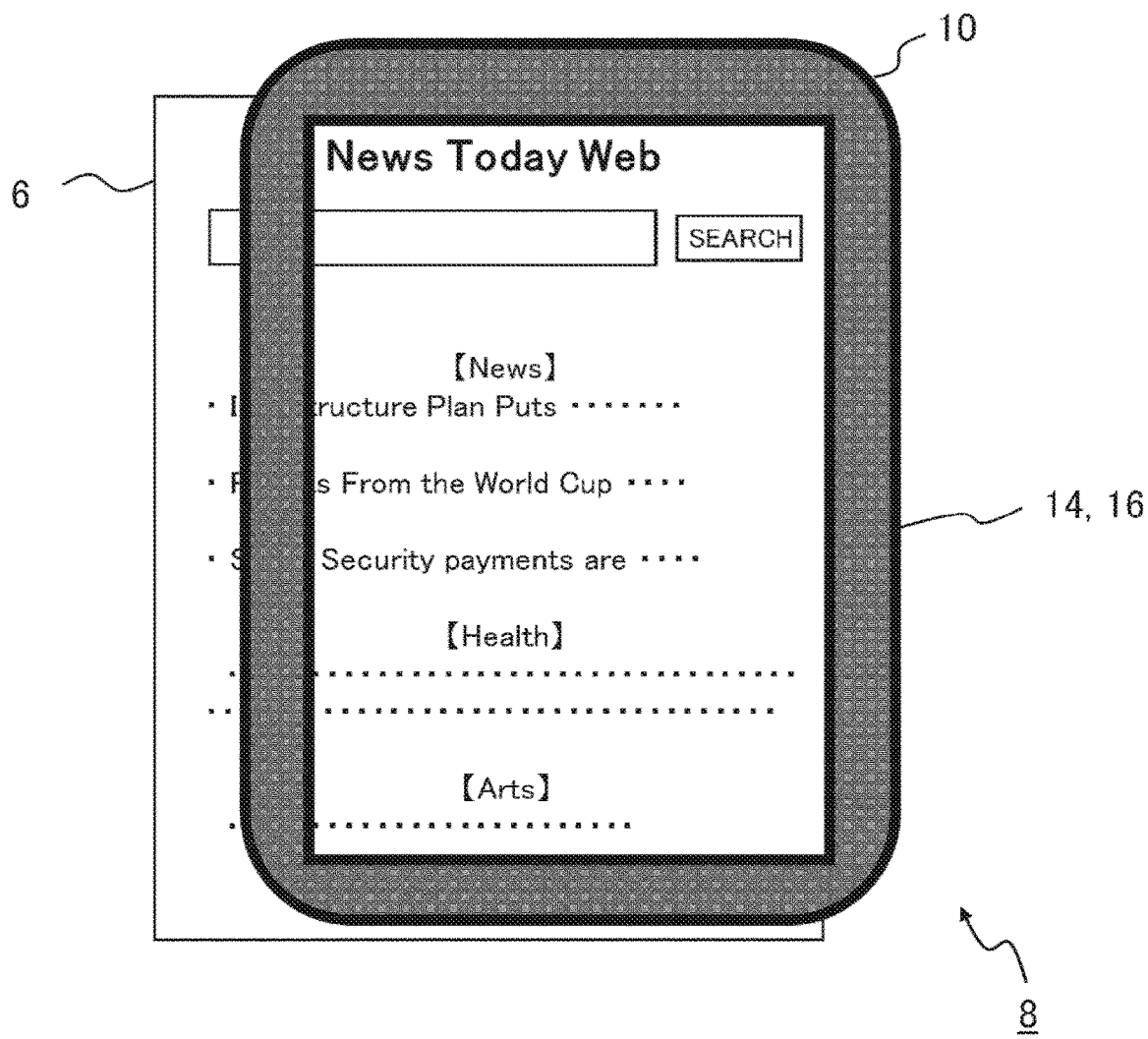
FIG. 1 is a view depicting a typical mode of image display to which an embodiment of the present invention may be applied.

FIG. 1 depicts a typical mode of image display to which an embodiment of the present invention may be applied. This illustrated example indicates a mobile terminal 8 integrating an image processing apparatus 10 with a display apparatus 16. The top surface of the screen of the display apparatus 16 is equipped with an input apparatus 14 in the form of a transparent touch pad for accepting a user's touch operations on a displayed image. It is to be noted that the image processing apparatus 10, the input apparatus 14, and the display apparatus 16 are not limited in implementation to those in the drawing. For example, these apparatuses may separately be implemented and connected in wired or wireless fashion with each other. Alternatively, two of these apparatuses may be integrated into one apparatus. For example, the display apparatus 16 may be implemented as a head-mounted display device (hereinafter referred to as the "HMD") that displays images before the eyes of the user wearing it on the head, with the image processing apparatus 10 being incorporated in the HMD.

The input apparatus 14 may be implemented not only as the touch pad depicted in the drawing but also as any one of or any combination of common input apparatuses such as a game controller, a keyboard, a mouse, and a joystick. Alternatively, the input apparatus 14 may be implemented as a microphone for receiving input of sounds or as an imaging apparatus for imaging the real space. When operated by the user, the input apparatus 14 accepts requests such as the start and end of processing, selection of functions and content, and input of various commands. The input apparatus 14 supplies the requests as electrical signals to the image processing apparatus 10.

The display apparatus 16 is a common apparatus that outputs images generated by the image processing apparatus 10. For example, the display apparatus 16 may be a display device of the mobile terminal in the drawing or of a tablet terminal, a liquid crystal display TV (Television) set, an organic EL (electroluminescence) TV set, a plasma TV set, or a PC (personal computer) monitor. The display apparatus 16 may alternatively be an HMD or a projector. It is to be noted that in the case where the display apparatus 16 is implemented as the HMD, a motion sensor disposed in the HMD may be used as the input apparatus 14 and the head movements may be interpreted as the user's operations.

The image processing apparatus 10 generates display image data in response to, for example, the user's operations via the input apparatus 14 and outputs the generated data to the display apparatus 16. Here, the type of information to be presented as the display image is not limited to anything specific and may be determined as needed depending on the functions and content details desired by the user. The illustrated example schematically depicts an image 6 presenting a website page as the display target. In this case, the image processing apparatus 10 establishes communication with a management server hosting the website and acquires therefrom page data and image data described in markup language such as HTML (Hyper Text Markup Language).

According to the data thus acquired, the image processing apparatus 10 renders character information using internally retained font data or the font data acquired from the server as needed, while also arranging other component images suitably to generate the image 6 or a part thereof. This method serves to maintain a certain level of legibility by adjusting characters and component images to an appropriate size in relation to the screen size and by also adjusting the above arrangements and line feed positions. On the other hand, the lower the resolution of the screen or the smaller the screen size, the lower the visibility becomes presumably due to the above adjustments leading to smudged or jagged characters.

Thus, the embodiment aims to cause the characters presented in the display image to be displaced continuously or oscillated in small amounts to let the character contours be clearly visible by human perception, thereby minimizing the worsening of visibility. It is to be noted that in a case where the display image is generated using fonts as in the above-mentioned website page, the fonts can be displaced individually. It follows that the number of characters targeted for displacement ranging from one to all characters in the image 6 and the positions of the characters are not limited to anything specific.

Meanwhile, the target to be displaced need not be in units of characters. For example, the entire image 6 or a partial region thereof may be displaced in very small amounts. That is, the displacement target may be not only characters but also pictures, shapes, marks, their combinations, or images formed by such combinations. That is, the type of the image is not limited to anything specific as long as the image can controllably be displaced and stopped on the display image plane as in the case of textures in a texture mapping technology. Also, the type of the display image presented using such a source image and the purpose of such display are not limited to anything specific. In the description that follows, these display targets will generically be referred to as "content." In addition, explained below is a representative method of using character fonts as the source image in generating content display images.

Figure 2:
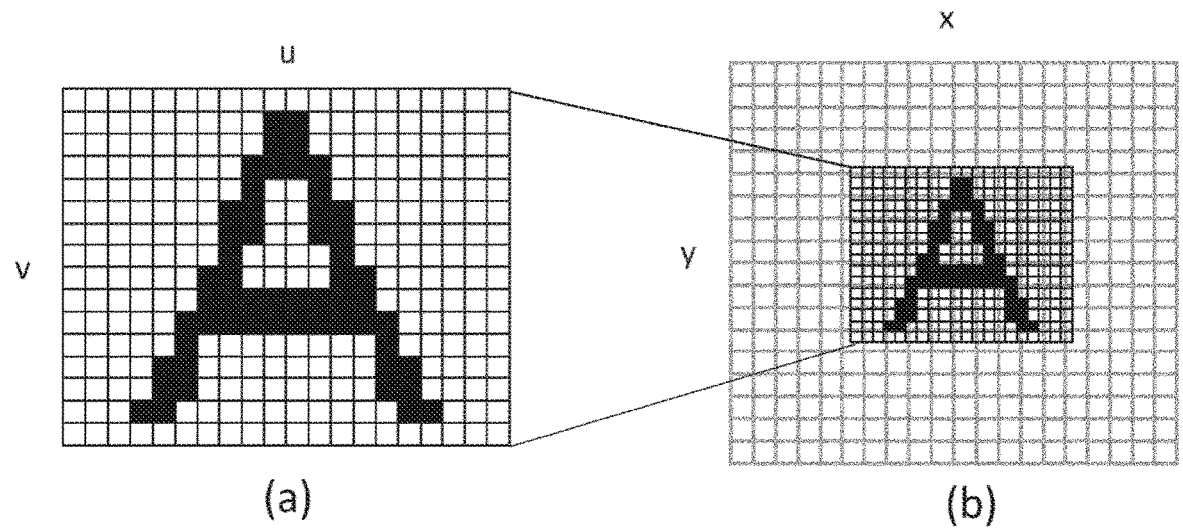
FIG. 2 is a view schematically depicting relations between font data displayed with the embodiment on one hand and pixels of a display apparatus on the other hand.

FIG. 2 schematically depicts relations between font data displayed with the embodiment on one hand and pixels of the display apparatus 16 on the other hand. Subfigure (a) in FIG. 2 indicates font data representing a character "A." Subfigure (b) illustrates how the font data is displayed on the screen of the display apparatus 16. This example presupposes the use of "bitmap font." As depicted in subfigure (a), of the two-dimensionally arranged pixels defined by (u, v) coordinates, those presented as lines of the character have a data structure in which the pixels are provided with pixel values different from those of the other pixels. Using the font data, the image processing apparatus 10 presents the character on an image plane corresponding to the resolution of the display apparatus 16.

That is, the u-v coordinates representing each of the pixels on the display image plane defined by (x, y) coordinates in subfigure (b) are obtained. The pixel values of the display image are then determined by sampling the pixel values of the corresponding position coordinates in the font image in subfigure (a). This process corresponds to texture mapping in computer graphics. It is to be noted that also well known as the font data is an "outline font" representing characters in the positions of feature points on contours such as line endpoints and curve reference points. In the case where the outline font is used, rasterization is performed in such a manner that the value of each pixel is determined by carrying out inside/outside determination on the pixels along the contour virtually presented on the display image plane. This case also provides advantageous effects similar to those of the displacement of characters.

Figure 3:
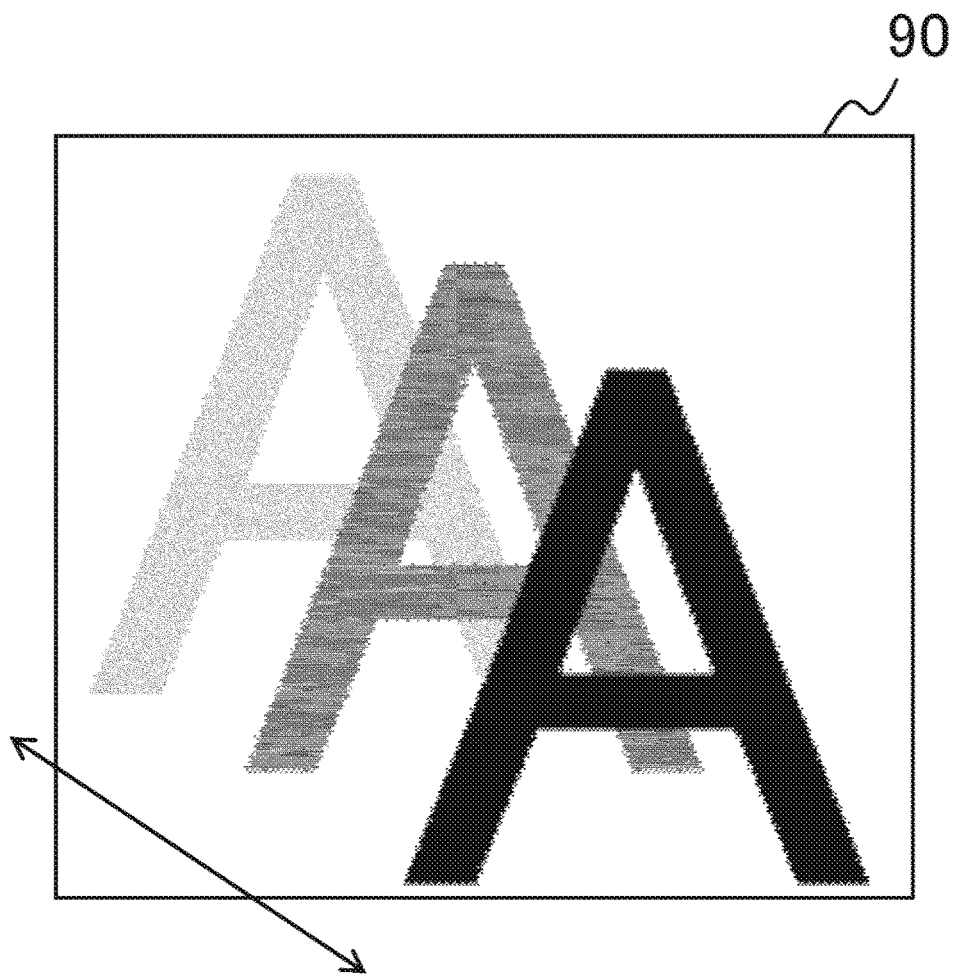
FIG. 3 is a view schematically depicting how a character is displaced on a display image plane with the embodiment.

FIG. 3 schematically depicts how a character is displaced on a display image plane. A region 90 is a region in which a character "A" is presented in the display image. Other characters and images may be displayed around this region. The image processing apparatus 10 displaces the font image of the character "A" associated with the region 90 in a predetermined direction at a predetermined velocity relative to the display image plane. In this illustrated example, three "A" characters indicate that the character "A" is moved in the top left direction in three consecutive frames. Incidentally, the three "A" characters in FIG. 3 are presented with different levels of luminance for the purpose of indicating that these characters are displayed at different times. In practice, the form of the character remains the same.

Also in FIG. 3, the amount of movement of the corresponding font image is presented in an exaggerated manner. The actual amount of movement is, however, as small as less than one pixel per frame. In the case of characters such as those on a website page that are normally still, a displacement of several pixels from bottom right to top left in the region 90 and a displacement of several pixels from top left to bottom right therein are oscillated repeatedly over multiple frames. This leaves the entire page configuration unaffected. It is to be noted that the direction of the displacement may be any one of longitudinal, crosswise, or diagonal directions, or any combination of these directions making up a random direction.

Also in FIG. 3, the entire character "A" is displaced. Alternatively, only segments of the lines making up the character may be displaced. For example, solely the line segments of which the high density is conducive to incurring illegibility may be displaced. Qualitatively, the contour can be made clearly visible in the direction of displacement. For this reason, the direction of displacement may be determined depending on the direction of the selected line. Alternatively, even in a case where all lines constituting the character are to be displaced, the direction of the displacement may be varied depending on the line.

Figure 4:
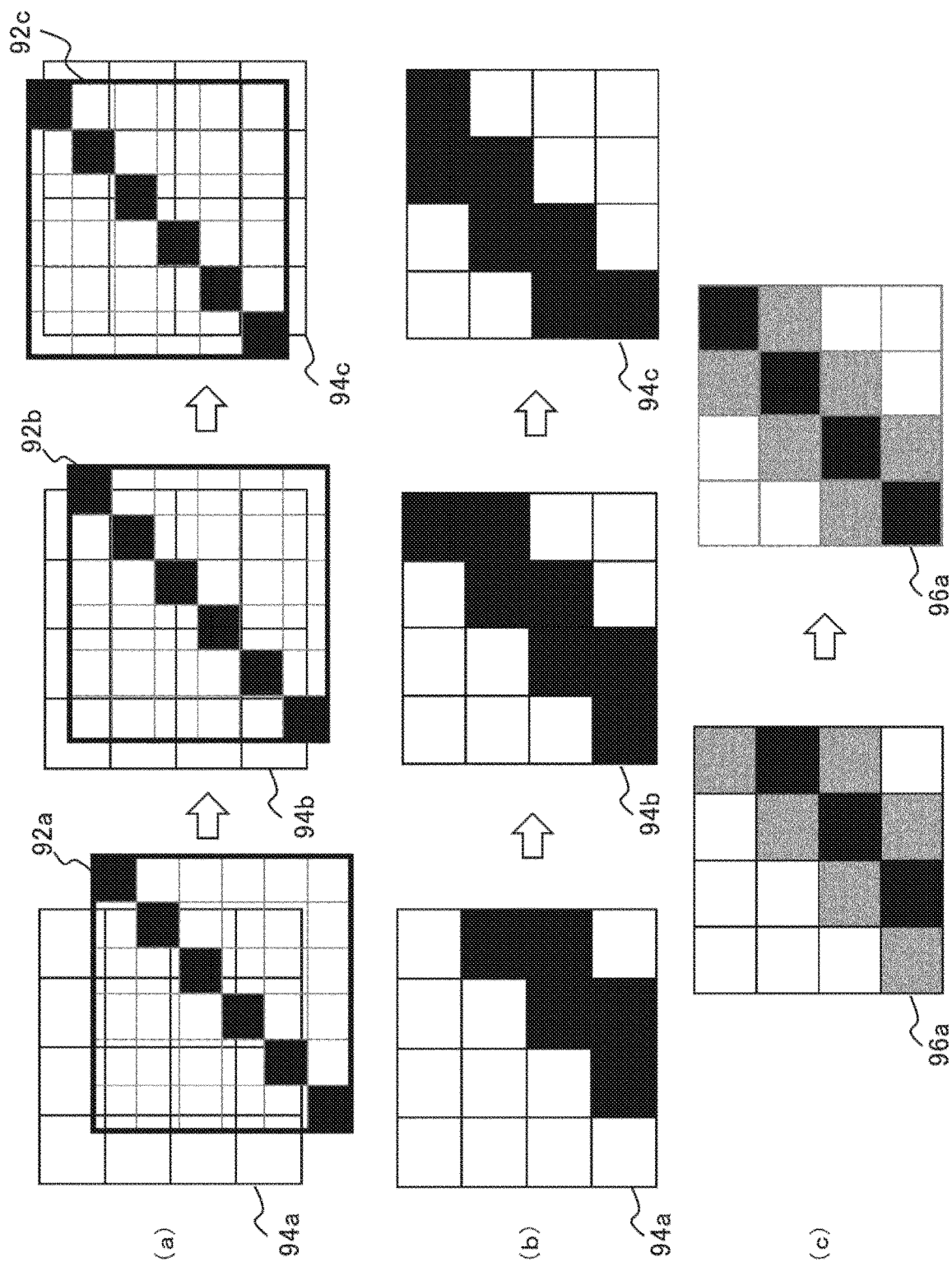
FIG. 4 is a view explaining perceptive effects provided by displacement of a character with the embodiment.

FIG. 4 is a view explaining perceptive effects provided by displacement of a character. Subfigure (a) in the top part of FIG. 4 depicts changes over time in the positional relation between a font image representing a character on one hand and a display image plane on the other hand. Specifically, it is assumed that font images 92a, 92b, and 92c like the image depicted in subfigure (a) in FIG. 2 are moved in that order relative to regions 94a, 94b, and 94c on a 4×4-pixel display image. The font images 92a, 92b, and 92c constitute part of a character such as a diagonal segment of the lines making up the character "A" in FIG. 3, for example.

The image processing apparatus 10 obtains the u-v coordinates in the font image corresponding to each of 4×4 pixels in the display image, thereby determining the pixel value of the display image in reference to the pixel value of the font data. Subfigure (b) in the middle part of FIG. 4 depicts how the pixel values are given to the regions 94a, 94b, and 94c regarding the changes over time illustrated in subfigure (a). As depicted, a diagonal line moving in the top left direction is also displayed on the display image. It is to be noted that depending on the resolution of the display apparatus, the line may become thicker than that of the original font data. For this reason, the character in each frame viewed as a still image may appear smudged or jagged unlike in the case of the original font data.

Subfigure (c) in FIG. 4 depicts how the display image appears to human perception when it is changed as illustrated in subfigure (b). In the change from the region 94a to the region 94b in subfigure (b), there are four patterns of pixels: a pixel changing from white to black, a pixel changing from black to white, a pixel remaining black, and a pixel remaining white. These four patterns of pixels also exist in the change from the region 94b to the region 94c.

Humans have characteristics of sensing visual stimuli through time integration. Thus, the pixel changing from white to black and the pixel changing from black to white are both recognized, in principle, as gray in color. Obviously, the pixel remaining black is recognized as black and the pixel remaining white is recognized as white. Thus, to human perception, as depicted in subfigure (c), the center of the line retains the original color of the character (black in this illustrated example), while the periphery of the line manifests a color in which the original color is blended with the background color (white in the example). That is, the displacement of the character thus emphasizes the color near the center axis of the line. The result is an alleviation of the illegibility of characters appearing smudged or jagged.

Figure 5:
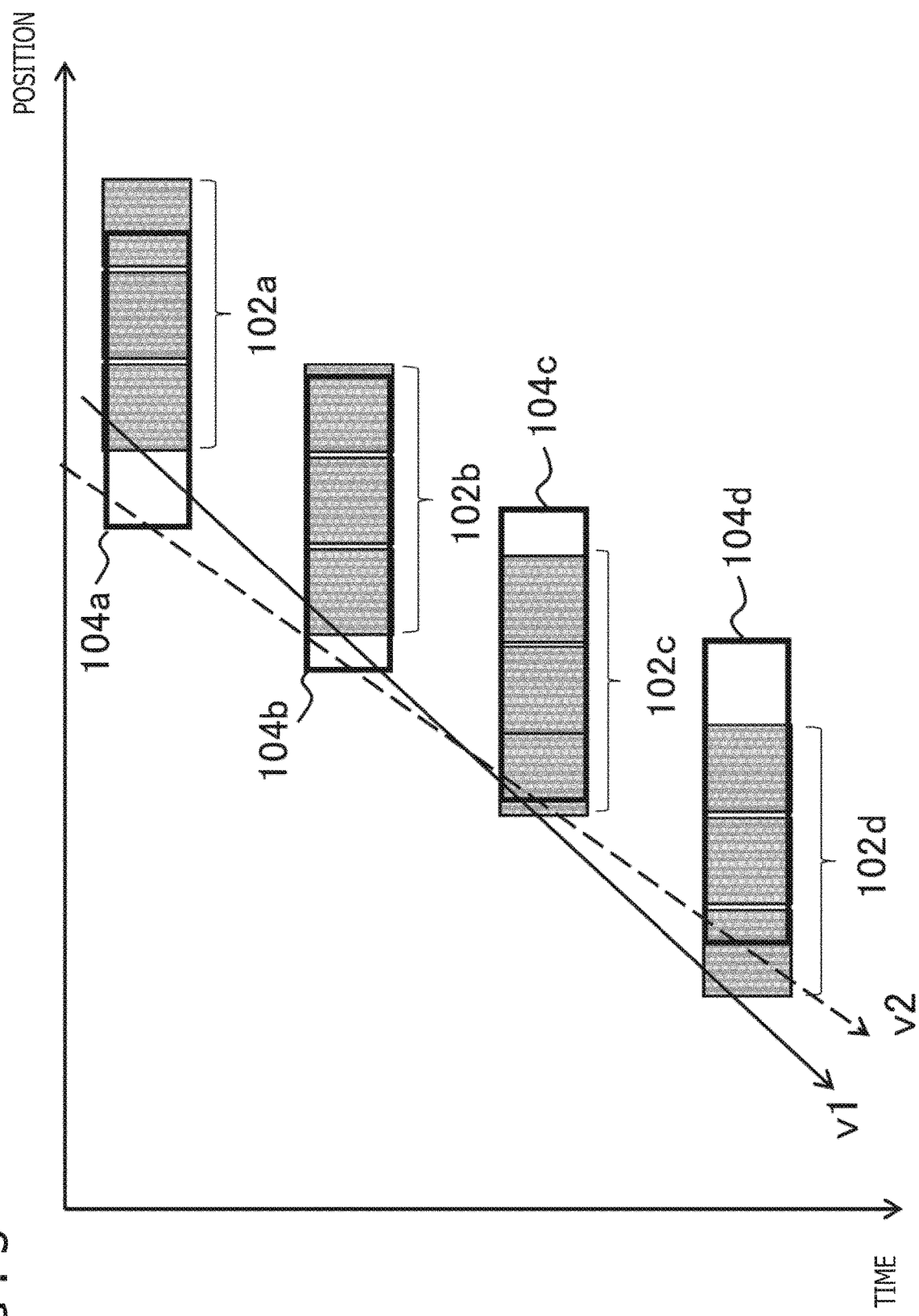
FIG. 5 is a view explaining how human perception occurs when the state in which a character being displaced is visually tracked is considered, in the embodiment.

FIG. 5 is a view explaining how human perception occurs when the state in which a character being displaced is visually tracked is considered. The horizontal axis in FIG. 5 denotes crosswise positions on the display image plane. The drawing depicts how parts of the character in FIG. 4, specifically, regions 102a, 102b, 102c, and 102d of three pixels representing the line width, are moved leftward over time on the display image plane. When the movement is visually tracked by humans, the regions viewed primarily are moved in a manner in which regions of gaze 104a, 104b, 104c, and 104d occur in that order.

That is, when the velocity v2 of the line of sight deviates from the velocity v1 of the character, the same color as that of the character (gray in this illustrated example) is likely to steadily appear near the center of the regions of gaze 104a, 104b, 104c, and 104d. On the other hand, the left or the right edge of the regions is likely to include the background color (white in the example). Whereas the velocity of the line of sight is assumed to be constant in the illustrated example, in practice, the velocity is uneven, so that similar tendencies can also occur. In the case where the color distributions in the regions of gaze 104a, 104b, 104c, and 104d are perceived through time integration, the center part of the line width is recognized as having the original color of the character while the periphery of the line width is recognized as having a color in which the original color is blended with the background color. Further, the width of the line viewed as having the original color of the character is determined without respect to the boundaries between the pixel regions representing the character, i.e., regardless of two boundaries between three pixels in this illustrated example. As a result, the line is recognized by human perception at a resolution higher than that of the display apparatus.

Figure 6:
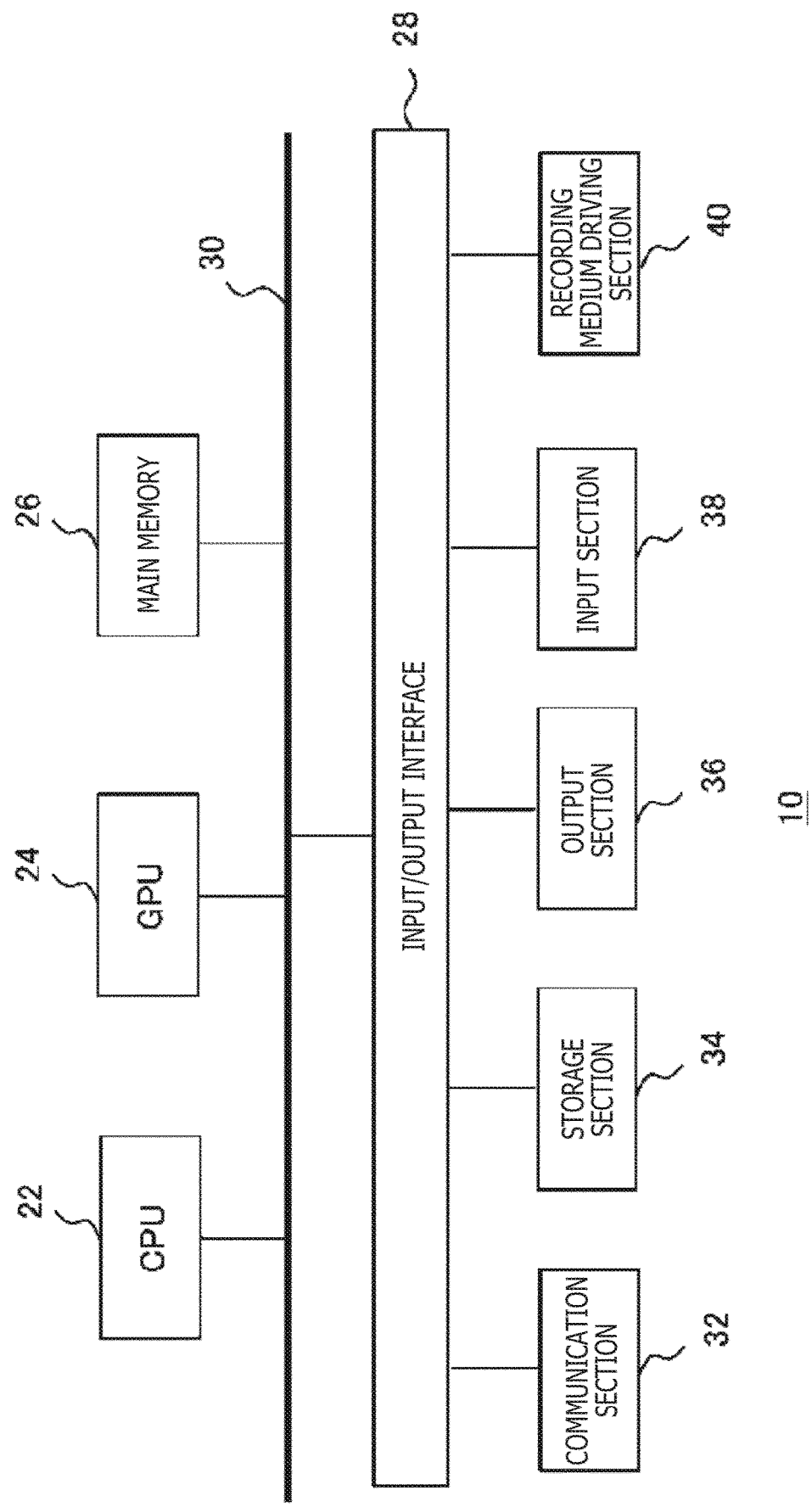
FIG. 6 is a view depicting an internal circuit configuration of an image processing apparatus of the embodiment.

FIG. 6 depicts an internal circuit configuration of the image processing apparatus 10. The image processing apparatus 10 includes a CPU (Central Processing Unit) 22, a GPU (Graphics Processing Unit) 24, and a main memory 26. These components are interconnected via a bus 30. The bus 30 is further connected with an input/output interface 28. The input/output interface 28 is connected with a communication section 32, a storage section 34, an output section 36, an input section 38, and a recording medium driving section 40. The communication section 32 includes a peripheral interface such as a USB or IEEE 1394 interface and a wired or wireless LAN interface. The storage section 34 includes a hard disk drive and/or a nonvolatile memory, for example. The output section 36 outputs data to the display apparatus 16. The input section 38 receives input of data from the input apparatus 14. The recording medium driving section 40 drives removable recording media such as magnetic disks, optical disks, or semiconductor memories.

The CPU 22 controls the entire image processing apparatus 10 by executing an operating system stored in the storage section 34. Further, the CPU 22 carries out various programs read out from a removable recording medium and loaded into the main memory 26 or downloaded via the communication section 32. The GPU 24 has the functions of a geometry engine and a rendering processor. The GPU 24 performs rendering processes in accordance with rendering instructions from the CPU 22 and stores the resulting display image into an unillustrated frame buffer. Further, the GPU 24 converts the display image stored in the frame buffer into a video signal before outputting the video signal to the output section 36. The main memory 26 is constituted by a RAM (random access memory) that stores programs and data necessary for the processing.

Figure 7:
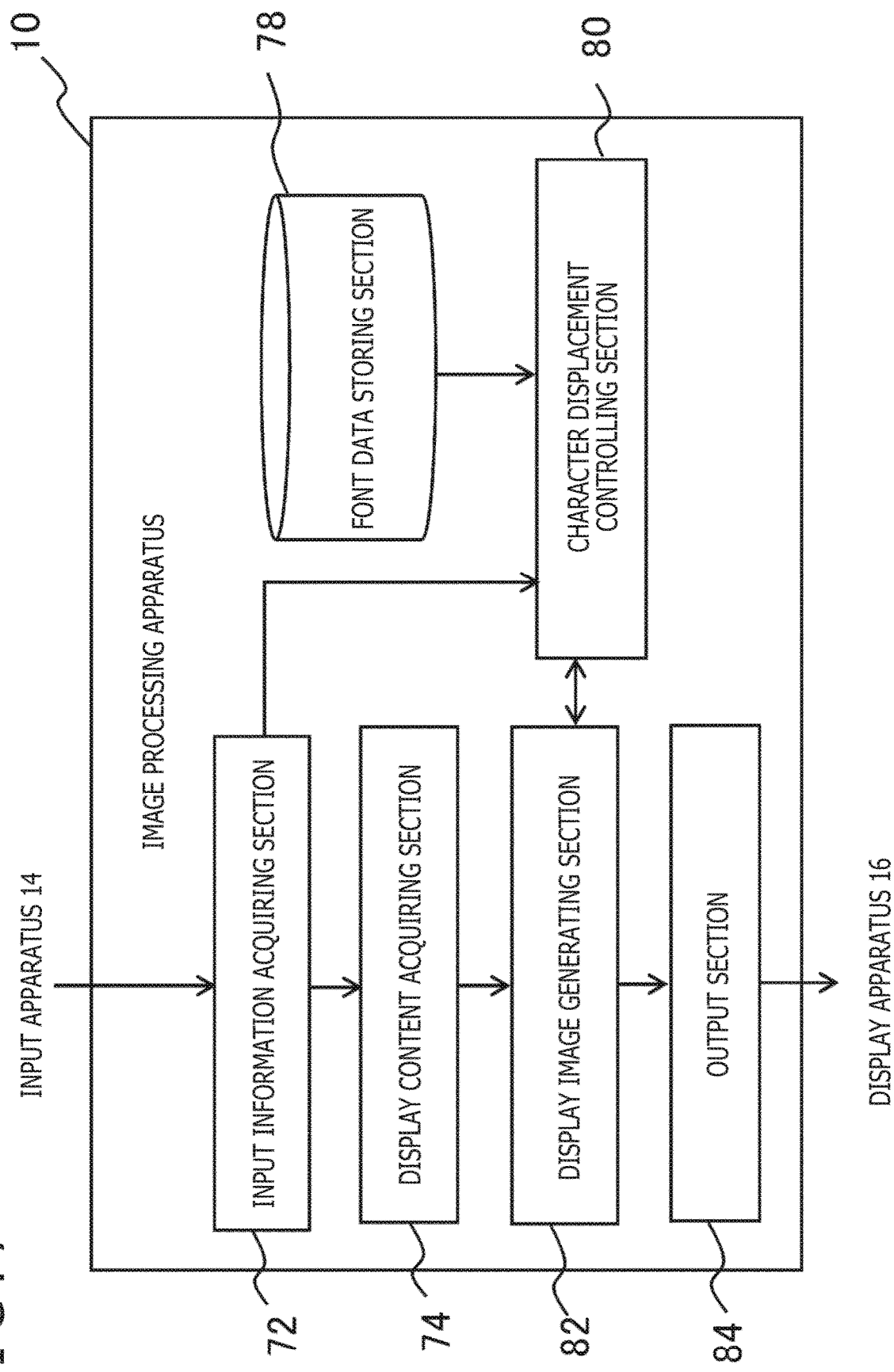
FIG. 7 is a view depicting a functional block configuration of the image processing apparatus of the embodiment.

FIG. 7 depicts a functional block configuration of the image processing apparatus 10 of the embodiment. The functional blocks in FIG. 7 are implemented in hardware using the CPU 22, GPU 24, main memory 26, output section 36, and input section 38 indicated in FIG. 6 or implemented in software using programs that are loaded from a recording medium into the main memory 26 to realize such functions as data input, data retention, calculation, image processing, and communication. Thus, it will be understood by those skilled in the art that these functions are implemented by hardware alone, by software alone, or by diverse combinations of these resources and are not limited to any specific one of such resources.

The image processing apparatus 10 includes an input information acquiring section 72 that acquires input information from the input apparatus 14, a display content acquiring section 74 that acquires the data of display target content, a display image generating section 82 that generates the data of a display image representing the content, a font data storing section 78 that stores the data of the fonts for use in the display image, a character displacement controlling section 80 that renders a character while controlling the displacement thereof, and an output section 84 that outputs the data of the display image.

The input information acquiring section 72, implemented using the input section 38 and CPU 22 in FIG. 6, acquires the details of user's operations from the input apparatus 14. Here, the user's operations may be related to known information processing such as selection of information processing details to be executed, selection of the display target content, start and end of the processing, and input of commands with regard to the currently executed information processing. The input information acquiring section 72 may further acquire, as needed, information regarding the user's point of gaze and measurements from a motion sensor disposed in the HMD, as will be discussed later. The input information acquiring section 72 supplies the acquired information to the display content acquiring section 74 and to the character displacement controlling section 80 as needed.

The display content acquiring section 74, implemented using the CPU 22, main memory 26, and communication section 32 in FIG. 6, acquires the data of the display target content. For example, in a case where the display target is a website page, the display content acquiring section 74 acquires the data of the page from a management server via an unillustrated network. Alternatively, the display content acquiring section 74 may read out content data stored in the image processing apparatus 10 or read out programs therefrom for generating the display image.

The display image generating section 82, implemented using the CPU 22, GPU 24, and main memory 26 in FIG. 6, performs basic processes for generating content images. That is, the display image generating section 82 creates an overall configuration of the display image in a buffer memory representing the plane of the display image, performing rendering processes on the regions where no font is used and mapping component images thereto. Further, with respect to the region in which a character is to be rendered using a font, the display image generating section 82 requests the character displacement controlling section 80 to carry out rendering processes by designating the relevant region and character.

The character displacement controlling section 80, implemented using the CPU 22, GPU 24, and main memory 26 in FIG. 6, renders the character using the font data stored in the font data storing section 78 in the region designated by the display image generating section 82. Various character fonts are stored beforehand in association with the displacement rules applicable thereto in the font data storing section 78. Preferably, the font data may be acquired from servers over the unillustrated network. The character displacement controlling section 80 controls the displacement of the character in accordance with the rules set for the font read out.

At this time, it is possible to determine, in accordance with the rules set for the content, whether to displace all characters of the display image, to displace a specific region thereof, or to displace only a specific character or a specific font. In addition, in a situation where good visibility is originally guaranteed such as where a large screen is used for display, the rendering processes may be omitted. The character displacement controlling section 80 displaces the displacement target character by a very small amount per frame in accordance with the rules set for the font data.

Strictly speaking, a font image is displaced on a sub-pixel level relative to the display image plane, the displacement being reflected gradually in the pixel value of the display image. The characters not targeted for displacement need only be rendered by known techniques. The display image generating section 82 successively outputs to the output section 84 the data of the generated display image including the character rendered by the character displacement controlling section 80. The output section 84, implemented using the CPU 22, GPU 24, main memory 26, and output section 36 in FIG. 6, successively outputs to the display apparatus 16 the data of the display image generated by the display image generating section 82.

Figures 8, 9:
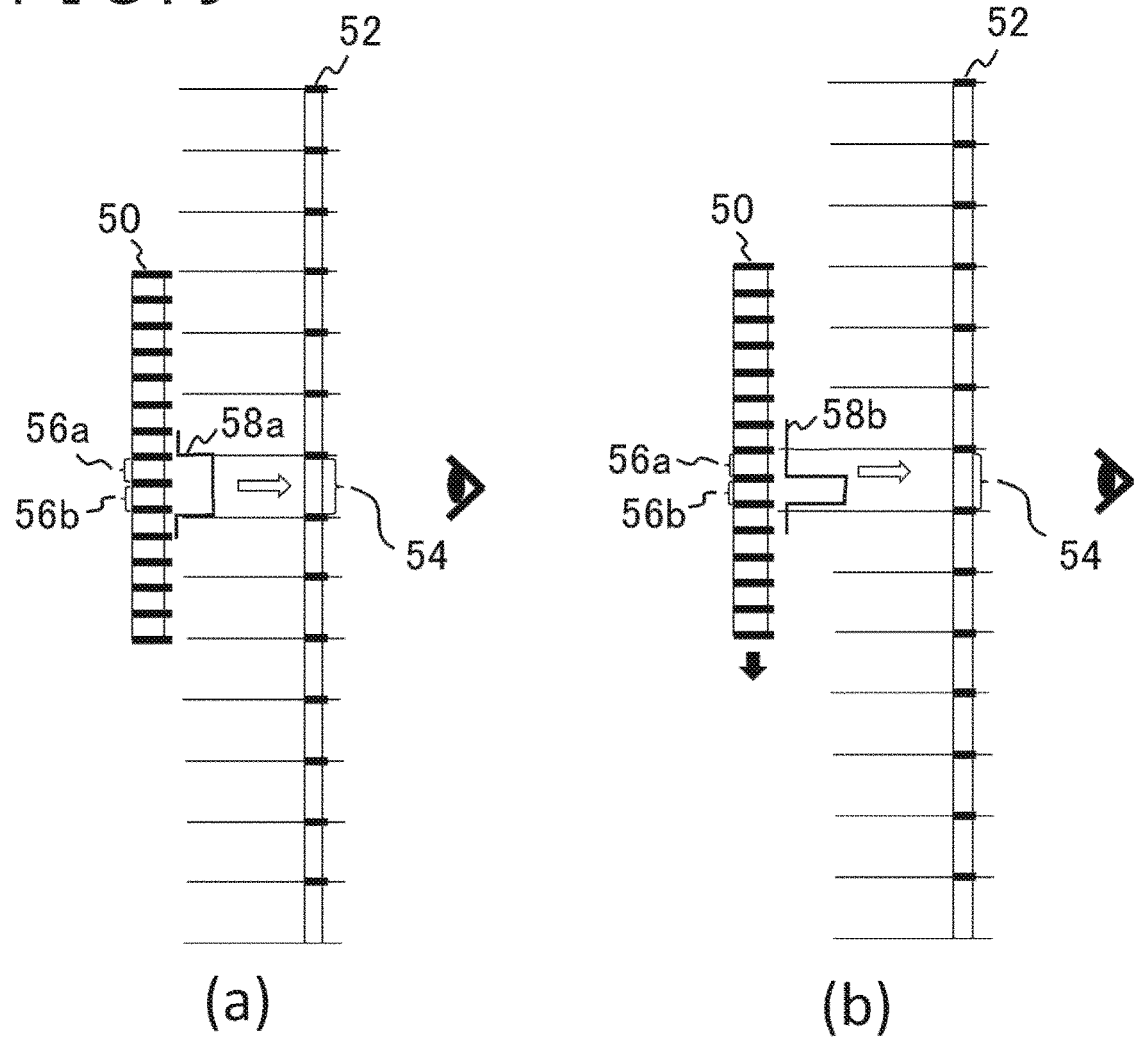
FIG. 8 is a view depicting a typical data structure of font data to be stored in a font data storing section of the embodiment.
FIG. 9 is a view explaining a typical method of determining a pixel value of a display image using bitmap font data with the embodiment.

FIG. 8 depicts a typical structure of font data to be stored in the font data storing section 78. The font data 110 is data that associates each character with identification information 112, a font shape 114, and displacement rules 116. The identification information 112 represents character identification information. In this illustrated example, the identification information 112 constitutes the character itself, such as each of the characters "A," "B," and "C." Alternatively, the identification information 112 may be any one of existing types of identification information such as character codes. The font shape 114 represents the shape of the character. Whereas the illustrated example gives notations such as "A (image)," "B (image)," and "C (image)," as the font shape 114, the font shape 114 in practice denotes an address indicative of a storage region where the font data is stored or the image data of each character itself.

The identification information 112 and the font shape 114 are associated with one another in a manner similar to that of exiting font data. Further, as mentioned above, the font shape may be represented in bitmap form or in outline form. The displacement rules 116 specifically denote character displacement rules such as displacement velocities and displacement directions. In this illustrated example, the character "A" is specified to be displaced by an amount of 0.5 pixels per frame in a direction of 30 degrees relative to the x-axis of the image plane. With the displacement rules thus set for each character, the displacement direction and the displacement velocity may be set appropriately depending on the density and direction of the line.

Meanwhile, the displacement rules common to all characters are set separately and retained in the character displacement controlling section 80. In addition, in the illustrated example, no displacement rule is set for the character "C." As described above, the displacement processes may be omitted with respect to this type of characters whose shape is relatively simple and not likely to vary in visibility depending on the resolution or character size. This alleviates the processing load. Incidentally, the data structure of the displacement rules is not limited to what is depicted in the drawing. For example, as mentioned above, each of the lines making up each character may be subjected to the settings of displacement direction, of displacement velocity, and of whether or not displacement is to be performed.

Preferably, each character may not only be displaced or oscillated in one direction but may also be displaced in a different direction such as longitudinally, crosswise, or diagonally in units of one or multiple frames. For example, a random number may be generated per frame, and the character may be displaced at an angle corresponding to the generated number. Further, the items to be set as the displacement rules may include, in addition to velocities and angles, a maximum amplitude and a frequency of oscillation in the case where the character is to be oscillated. When the data of the illustrated structure is set for diverse fonts, a given character may suitably be displaced depending on how likely the character will be smudged, for example.

Here, the shapes of the fonts are not limited to the existing ones and may be generated separately on the assumption that they are to be displaced. For example, on the assumption that the character is visually recognized in the direction of displacement with a high resolution such that its line width appears smaller than upon actual display, the lines in the font may be made thicker or adjusted in a balanced manner with respect to other lines. When the displacement rules are formulated to address diverse cases including the case above, it is preferred that the characters be actually displaced at various resolution levels in various character sizes so that the conditions conducive to the best visibility may be established beforehand.

With this embodiment, as discussed above, the characters are displaced at least in the display image to minimize the adverse effects on character visibility that are attributable to low resolution levels or small character sizes on the display apparatus. In that respect, although both the bitmap font and the outline font may be used as the font data, using the bitmap font in particular permits better sharpness of character contours through suitable manipulation of the distribution of sampling points.

FIG. 9 is a view explaining a typical method of determining a pixel value of a display image using bitmap font data. Subfigures (a) and (b) in FIG. 9 both schematically depict a font image 50 and a display image 52 as viewed from the side. On each plane of the images, thick lines arranged at equal intervals indicate pixel boundaries. In a case where the pixels of the font image 50 are finer than those of the display image 52, one pixel in the display image 52 corresponds to multiple pixels in the font image 50. In this illustrated example, two pixels 56a and 56b in the font image 50 correspond to one pixel 54 in the display image 52.

If it is assumed here that the pixels 56a and 56b in the font image 50 respectively have values p1 and p2, the pixel value C of the pixel 54 in the display image 52 is determined as follows.

$$C=(p1+p2)/2$$

It is to be noted that the above equation considers solely the correspondence between pixels in one dimension. In a case where two dimensions including the depth direction of the drawing are taken into account and where 2×2=4 pixels in the font image 50 correspond to the pixel 54 in the display image 52, an average of the four pixel values is used as the pixel value C of the pixel 54.

Preferably, surrounding pixels in the font image may additionally be considered, and the pixel value C may accordingly be obtained as follows.

$$C=p0/4+p1/2+p2/4$$

Here, p0 stands for a pixel adjacent to the pixel 56a in the font image. It is to be noted that also in this case, the font image is, in practice, referenced in two dimensions including the depth direction of the drawing in determining the pixel value. That is, the pixel values included in a predetermined range centering on that position in the font image corresponding to one pixel in the display image are convolved for determining the pixel value in the display image.

The above-described method allows the pixels near the character contour to be given the pixel values having the character color blended with the background color. The result is a blurred character contour that reduces jaggedness. On the other hand, if the above method is used to displace the character for better line visibility, it is preferred that the character contour in each frame be made conspicuous against the background. For this purpose, during the period in which the character is being displaced, a reference range of the font image is narrowed as depicted in subfigure (b) in FIG. 9. For example, of the two pixels 56a and 56b in the font image 50 that correspond to the pixel 54 in the display image 52, only the pixel 56b is referenced in order to determine the pixel value C as follows.

$$C=p2$$

It is to be noted that the above-described effects work only in the direction of movement of character so that the reference range is narrowed in the direction of movement. In a direction perpendicular to the direction of movement of character, the reference range is made similar to that in the case where the character is stationary as depicted in subfigure (a). It is to be noted that while exactly two pixels in the font image correspond to one pixel in the display image in this illustrated example, the correspondence between the pixels of the two images is not limited to anything specific. That is, regardless of the reduction rate of the font, window functions 58a and 58b each stipulating a reference range and a weight may be switched from one to another depending on the stop and displacement of the character, before the pixel values in the font image are convolved.

Figure 10:
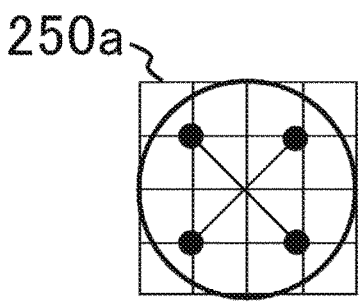
FIG. 10 is a view schematically depicting how a reference range of a font image is typically changed with respect to two-dimensional displacements of a character with the embodiment.
Figure 10:
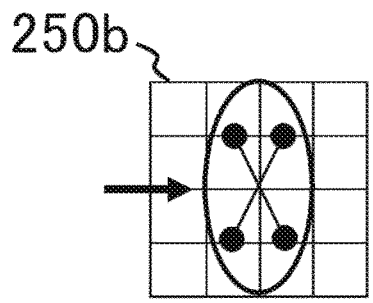
Figure 10:
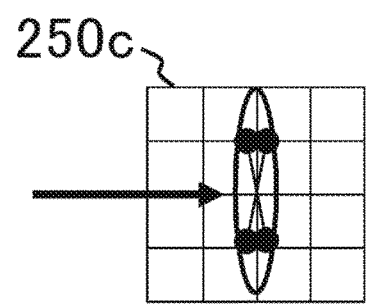
Figure 10:
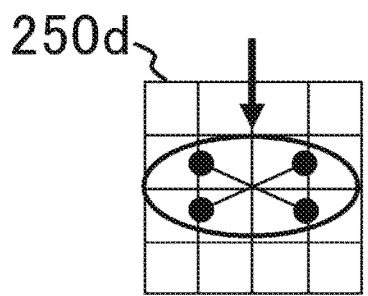
Figure 10:
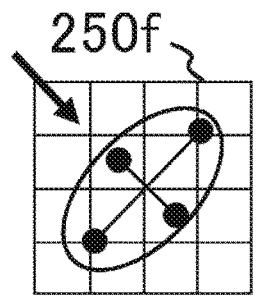
Figure 10:
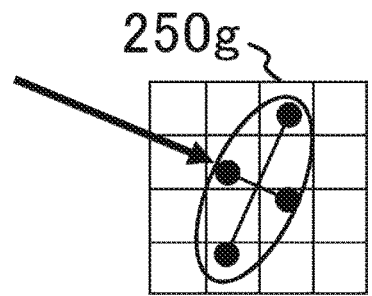
Figure 10:
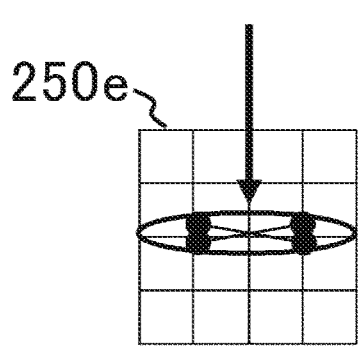
Figure 10:
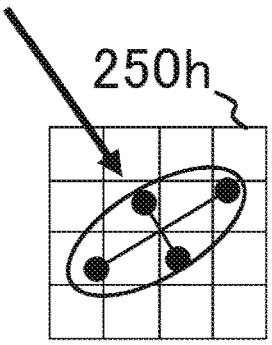
Figure 10:
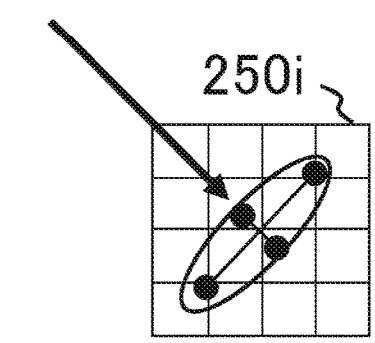

FIG. 10 schematically depicts how a reference range of a font image is typically changed with respect to two-dimensional displacements of a character. In this drawing, it is assumed that one pixel in the display image corresponds to a 4×4-pixel block in the font image. A circle or an ellipse in each pixel block specifies the reference range at the time of character displacement using a velocity vector indicated by an arrow. It is to be noted that while the circle or ellipse conceptually represents the reference range in the font image for use in determining the pixel value, in practice, discrete sampling points such as those indicated by black circles are determined depending on the range.

First, when the character is stationary, a range at equal distances from the pixel block center is referenced as indicated in a pixel block 250a by a circle. This causes the pixels near the character contour in the display image to present a color blending the character color with the background color. In a case where the character is displaced crosswise relative to the display image, i.e., where the velocity vector is (Vx, 0), the reference range is made narrower crosswise as the velocity Vx becomes higher, as indicated in pixel blocks 250b and 250c by ellipses. In a case where the character is displaced longitudinally relative to the display image, i.e., where the velocity vector is (0, Vy), the reference range is made narrower longitudinally as the velocity Vy becomes higher, as indicated in pixel blocks 250d and 250e by ellipses.

In a case where the character is displaced diagonally relative to the display image, i.e., where the velocity vector is (Vx, Vy), the reference range is made narrower in the same direction as the velocity vector, as the velocity $(Vx^2+Vy^2)^{1/2}$ becomes higher, as indicated in pixel blocks 250f, 250g, 250h, and 250i by ellipses. It is to be noted that, as long as the reference range is narrowed in relation to the increase in the movement velocity, the relation between the reference range and the velocity is not specifically limited. For example, the relation may be defined by inverse proportion, by a linear function, or by an exponential function.

As described above, when the reference range in the font image is changed depending on the velocity of the character, preference is given to the blending of the character color with the background color at low velocity and to the sharpness of the contour at high velocity, the preference being adapted to human visual characteristics in relation to velocity. Preferably, an optimum velocity of a given character may be determined according to positional relations with other characters in addition to the shape and size of the character of interest. Further, when the reference range is not adjusted in keeping with velocity but is nevertheless displaced, the reference range may always be narrowed in the direction of displacement by a predetermined proportion.

Figure 11:
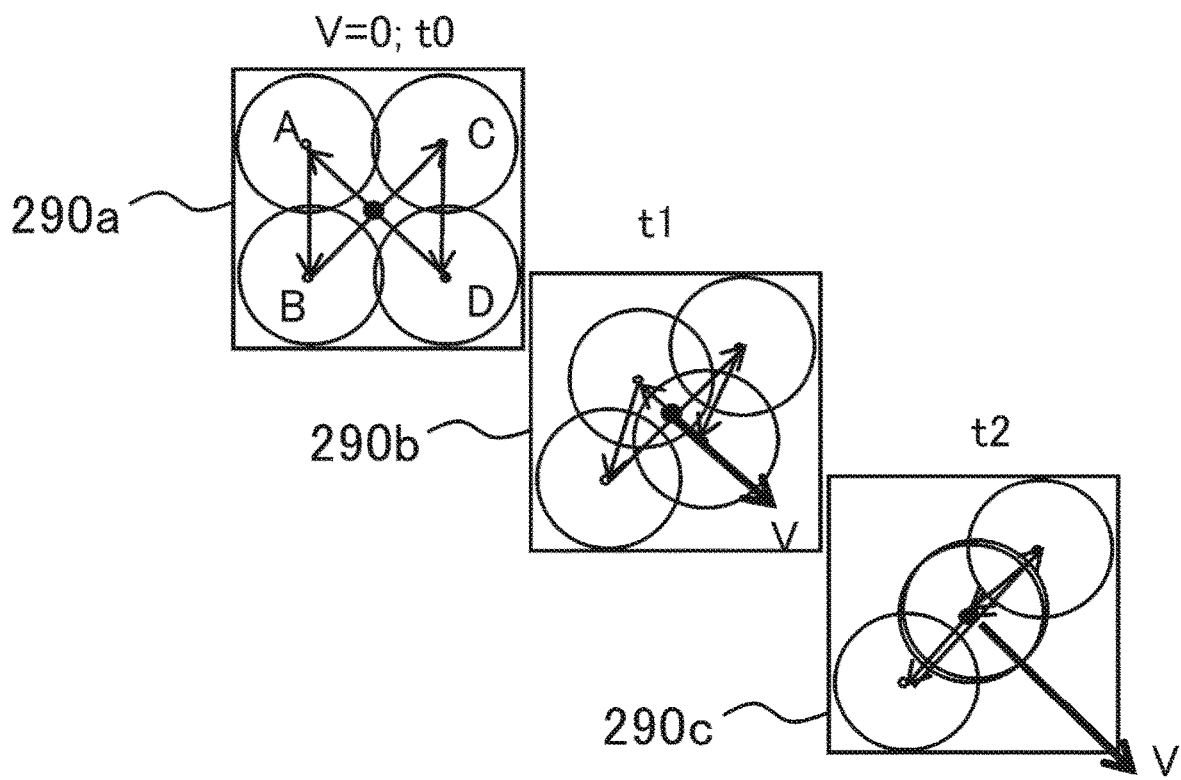
FIG. 11 is a view schematically depicting how sampling is performed in a mode where sampling points are separated in their distribution in the time direction with the embodiment.

In the above-described mode, one or multiple sampling points are determined in the font image and their pixel values are calculated on a weighted average basis to determine the pixel value in the display image per frame. On the other hand, when sampling points are separated in their distribution in the time direction over consecutive frames, these points may be blended cognitively using the time integration capability of human visual perception even in a state in which the character is stationary. FIG. 11 schematically depicts how sampling is performed in a mode where sampling points are separated in their distribution in the time direction.

Three rectangles in FIG. 11 represent the region in the font image corresponding to one pixel in the display image at times t0, t1, and t2. For example, a block of 2×2 pixels constitutes each of the rectangles. It is to be noted that the pixel boundaries in the font image may or may not coincide with the pixel boundaries in the display image. First, with the character being stationary (V=0), sampling points are evenly set at equal distances from the center of a pixel block 290a. In this illustrated example, four sampling points A, B, C, and D are provided as midpoints each between the center of the pixel block 290a and one of four vertexes thereof.

In the case where four sampling points are provided as described above, four frames of the display image are counted as one unit. The sampled four pixel values appear one after another in one unit display time. That is, the pixel value of the sampling point A first appears in the first frame of the unit as the pixel value of the display image. The pixel values of the sampling points B, C, and D then appear respectively in the second, third, and fourth frames, each as the pixel value of the display image. Then, to the user viewing the pixels over the frames of one unit, the colors of the sampling points A, B, C, and D appear blended thanks to the time integration capability of human visual perception. As long as the character remains stationary, the pixel value of the same sampling point is cyclically read out and displayed.

In a case where the character is being displaced, the reference range is narrowed in the direction of the velocity vector as in the case in FIG. 10. At this time, as depicted in pixel blocks 290b and 290c, the distribution of the sampling points is adjusted in such a manner that the higher the velocity V, the narrower the reference range becomes. In addition, as in the case of the character remaining stationary, the pixel values of four sampling points are then read out consecutively over four frames and displayed individually per frame. This causes the colors of the four sampling points to appear blended to the user viewing the frames of one unit.

The above mode also provides advantageous effects similar to those at the time of averaging the pixel values in the reference range in relation to the velocity in one frame of the display image. In addition, because one pixel value of the font image need only be read out per pixel per frame, the increase in the processing load is minimized compared with the case where multiple pixels are simultaneously read out and calculated. Further, regardless of whether or not the character is stationary, the changing colors presented in a short time period are uniformly perceived through time integration, so that there is no cognitive discontinuity attributable to the switching between the stationary state and the displacement state.

It is to be noted that whereas there are four sampling points in the font image for each pixel in the display image in the illustrated example, this is not limitative of the present embodiment. In the case where N sampling points are provided per pixel, N frames constitute one unit. Preferably, multiple pixel values of the font image may be read out at a time and averaged to obtain the pixel value for one frame. For example, where the pixel value in the display image is determined using two pixel values of the font image, the values of sampled N pixels may be presented in N/2 frames.

Figure 12:
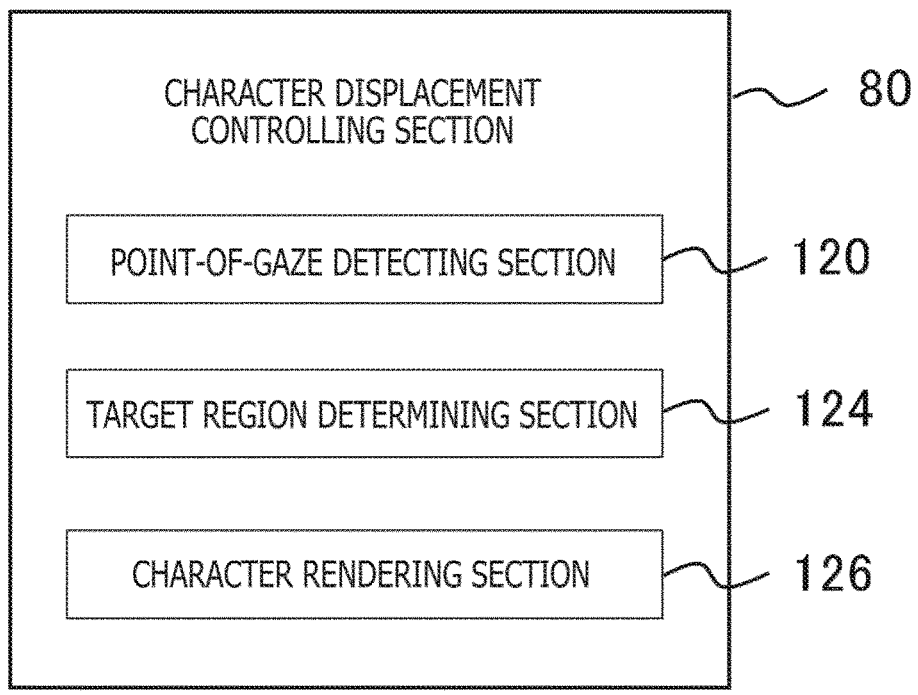
FIG. 12 is a view depicting a functional block configuration of a character displacement controlling section in a case where characters are displaced only in the region of a display image that is gazed at by a user.

The target as the characters to be displaced as described above may cover the entire display image or may occupy a partial region thereof. FIG. 12 depicts a functional block configuration of the character displacement controlling section 80 in a case where characters are displaced only in that region of the display image that is gazed at by the user. In this configuration, the character displacement controlling section 80 includes a point-of-gaze detecting section 120, a target region determining section 124, and a character rendering section 126. The point-of-gaze detecting section 120 acquires, at a predetermined rate, information indicative of where the user is gazing at on the display screen, the information being supplied from an unillustrated point-of-gaze detector which is connected with the image processing apparatus 10.

The point-of-gaze detector is a known apparatus that detects a point gazed at by a person watching the target including the point typically by detection of infrared rays reflected from the eyes after being emitted thereto. For example, where the display apparatus 16 is the HMD, the point-of-gaze detector may be incorporated in the HMD. Further, in a mode where the image is displayed in a field of view corresponding to the line of sight of the user wearing the HMD, the center of the display image is assumed to be the approximate point of gaze. In this case, the function of the point-of-gaze detecting section 120 may be omitted. However, it is to be understood by those skilled in the art that the display apparatus 16 is not limited to the HMD and that the point of gaze may be identified in diverse forms.

The target region determining section 124 determines a predetermined range around the point of gaze in the display image as the target region in which the character is to be displaced. For example, a circular or rectangular region of a predetermined size centering on the point of gaze on the screen is determined as the target region. Alternatively, depending on the details being displayed, an article or an item including the point of gaze may be determined as the target region. The character rendering section 126 displaces the character in the target region in accordance with relevant settings. In the other regions, the character rendering section 126 renders each character in the state in which it remains stationary. When the region in which the character is to be displaced is limited in this manner, the part being viewed by the user allows the character therein to be clearly perceived by the user, while the number of times rendering is performed is reduced in the regions not affecting the user's perception. This contributes to alleviating the processing load.

Figure 13:
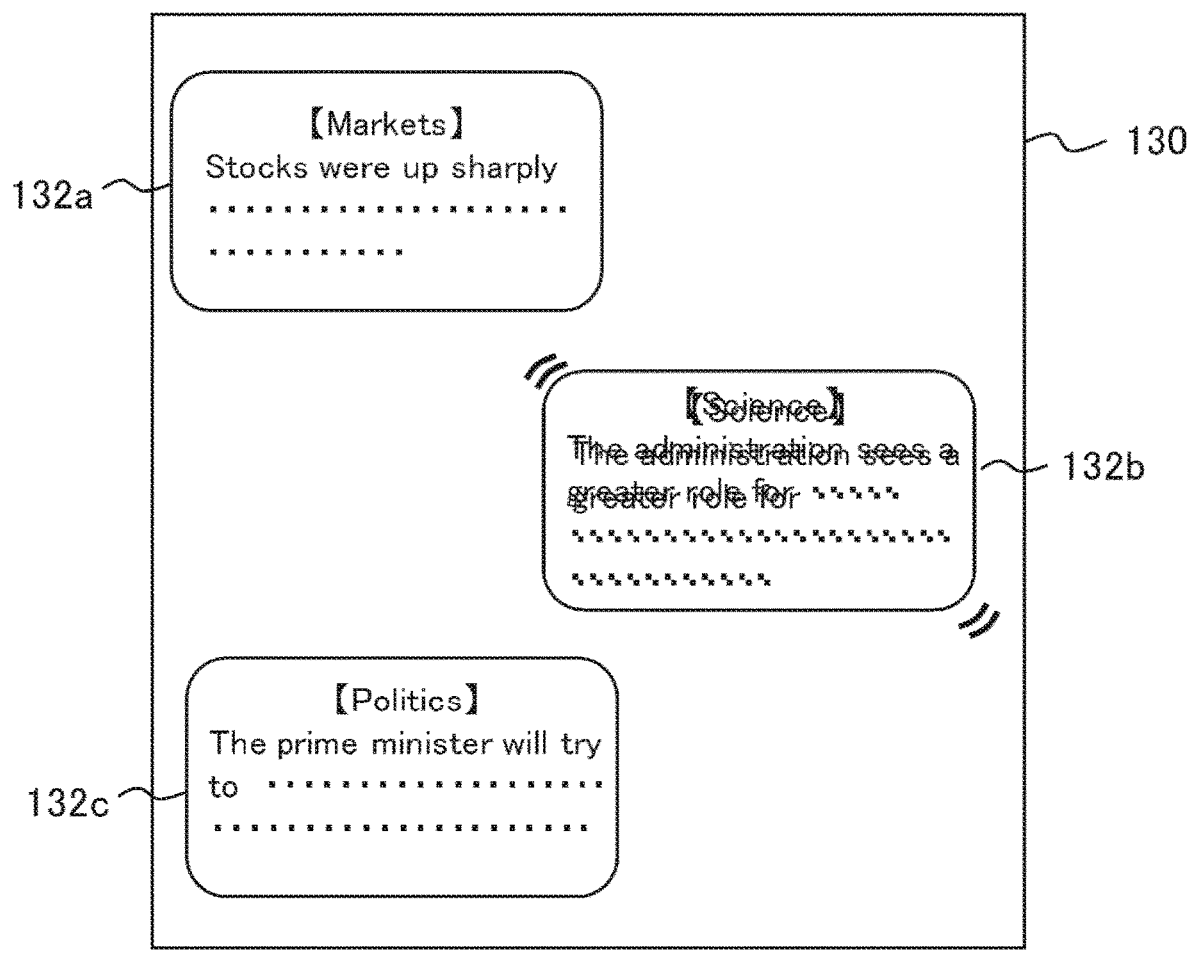
FIG. 13 is a view depicting a typical screen on which characters in a target region of a display image are displaced, in the embodiment.

FIG. 13 depicts a typical screen on which characters in the target region of the display image are displaced. A display screen 130 is configured with multiple regions 132a, 132b, and 132c each enclosed by a line and presenting a news article. In a case where the user's point of gaze is within the region 132b among these regions, the characters in that region 132b are displaced. It is to be noted that whereas this drawing depicts the displaced characters overlapping with one another, the display position of each character is actually displaced by a very small amount from one frame to another as described above. The drawing is thus not intended to indicate that the displaced characters are being displayed all at once.

The above mode is an example in which the target region is determined according to the details being displayed. Preferably, instead of the point of gaze being detected for target region determination, the region selected by the user through the input apparatus 14 may be determined as the target region. Where the regions are clearly separated in the display image as illustrated, the selection of one of the regions may be accepted through the use of a pointing device. It is to be noted that the characters in the target region may each be displaced independently in accordance with font data settings or the region 132b as a whole may be displaced. In the latter case, the displacement rules set in the font data for each character as indicated in FIG. 8 may be set in the content data for the region 132b.

Further, the displacement of characters may be performed either as oscillation too small to be perceived by the user or as a movement large enough to be recognized distinctly. In the latter case, the displacement may be so large that the region 132b positioned on the right edge of the screen is moved to the left edge for example. Preferably, there may intentionally be created a situation where a large movement is not awkward and is carried out in a manner realizing the fun of such a dramatic effect and good legibility of characters at the same time. For example, a vehicle carrying and moving the region 132b may be presented on the display screen 130, the vehicle being moved right and left to displace the region 132b. Whereas the illustrated example displays news articles as character information, an object presenting character strings may be moved intentionally for better visibility on the display of a game screen or of a virtual world.

Figure 14:
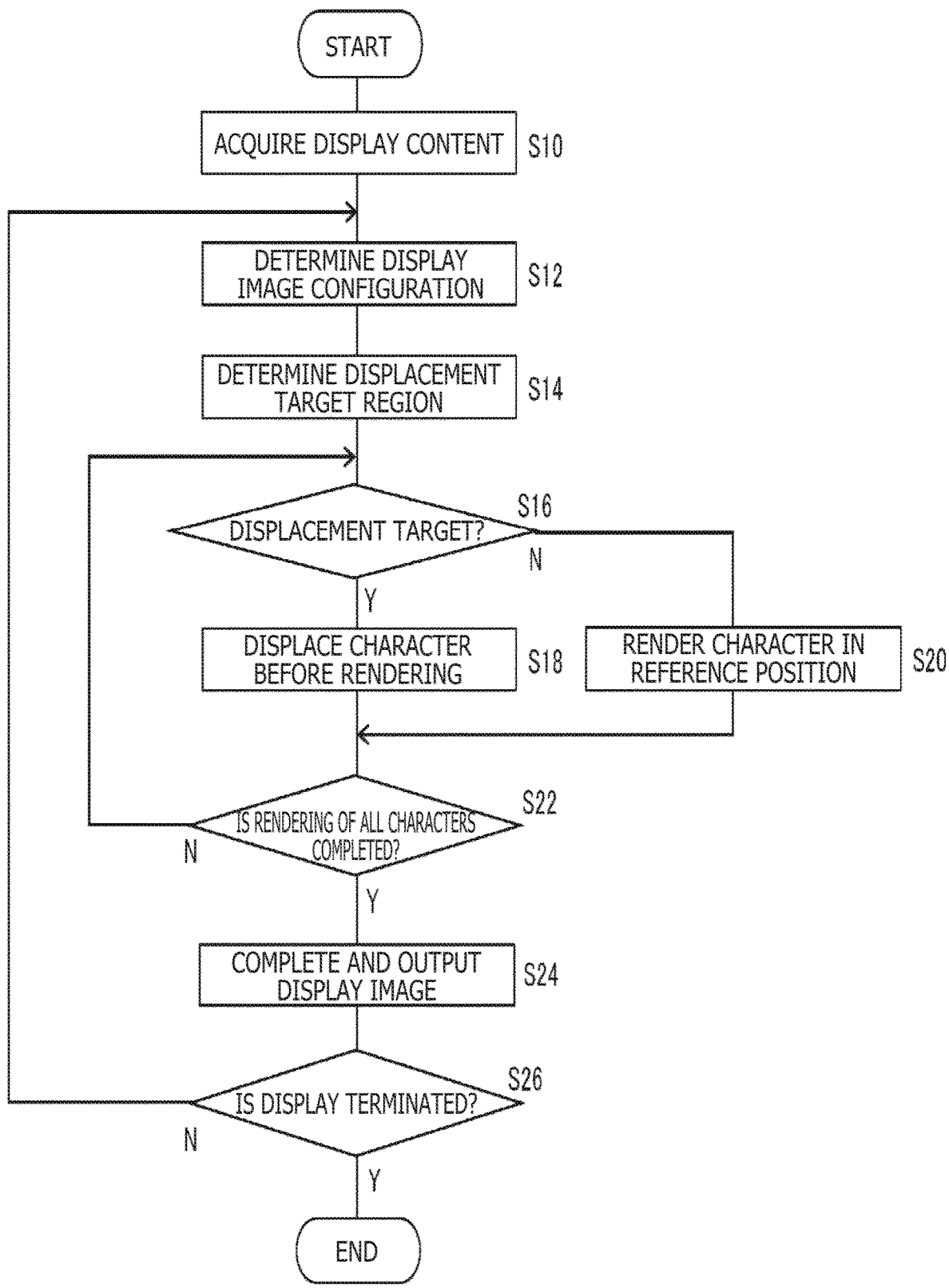
FIG. 14 is a flowchart depicting processing steps in which the image processing apparatus of the embodiment generates and outputs a display image of which the characters are displaced as needed.

Explained below are the operations of the image processing apparatus implemented by use of the above-described configuration. FIG. 14 is a flowchart depicting processing steps in which the image processing apparatus 10 of the embodiment generates and outputs a display image of which the characters are displaced as needed. First, the display content acquiring section 74 in the image processing apparatus 10 acquires the data of the content to be displayed, on the basis of the operations performed by the user on the input apparatus 14 (S10).

Next, the display image generating section 82 determines an overall configuration of a display image by interpreting and processing the details of the content as the display target (S12). Then, the display image generating section 82 requests the character displacement controlling section 80 to render the regions that are to be rendered by use of fonts. The character displacement controlling section 80 determines one of the regions requested to be rendered as the target region in which characters are to be displaced, in accordance with predetermined criteria (S14). The target region may be the entire display image or a partial region thereof corresponding to the point of gaze or to the user's operations. Further, prior to step S14, the character displacement controlling section 80 may determine whether or not to perform character displacement processes, in accordance with predetermined criteria.

With this embodiment, the characters are displaced in such a manner as to maintain their legibility even in a situation where illegibility or jaggedness may result from the resolution or the display character size of the display apparatus. In other words, in a situation where good visibility is originally guaranteed such as where a large screen is used for display or where the number of characters is limited so as to minimize reductions in their size on a small screen, the displacement processes may be omitted. It is also possible to determine whether or not to perform the displacement processes depending on the user's eyesight or how the user is viewing the display apparatus.

Typical criteria applicable to determining whether to perform the displacement processes are as follows:

1. The resolution of the display apparatus 16 is equal to or lower than a predetermined level.
2. The size of the display target character on the screen is equal to or smaller than a predetermined value.
3. The number of pixels representing the display target character is equal to or smaller than a predetermined value.
4. The distance from the user to the screen is equal to or shorter than a predetermined value.
5. The user's eyesight is equal to or less than a predetermined value.
6. The velocity of the screen is higher than zero.

The distance applicable to the criterion 4 above may be estimated in real time from the size of an image captured of the user by an imaging apparatus disposed near the screen of the display apparatus 16. Alternatively, the value in a normal state may be registered beforehand by the user. Also, the eyesight applicable to the criterion 5 above is to be registered beforehand by the user. The velocity of the screen applicable to the criterion 6 above presupposes that characters are difficult to read in a situation in which the screen is swayed such as the case where the user is viewing the mobile terminal in a car. In this case, the character displacement controlling section 80 may identify the velocity of the screen by acquiring measurements from a motion sensor disposed inside the terminal.

The above criteria may be applied singly or in a combination of at least two thereof in order to evaluate character illegibility from multiple angles. For example, the actual situation is scored with respect to multiple criteria, and the sum of the scores may be used as the basis for determining whether or not to perform the character displacement processes. When the displacement processes are performed as needed in this manner, the user is spared an awkward sensation of watching sufficiently visible characters losing their visibility when they are needlessly displaced. Furthermore, the load of the rendering processes is reduced and so is power consumption.

Next, the character displacement controlling section 80 reads out the data of the character to be rendered, from the font data storing section 78, and renders the character in the region of a rendering destination on the display image plane. Here, if the rendering destination is included in the displacement target region (Y in S16), the character is rendered in a position that presupposes displacement inside the region for presenting the character of interest (S18). For example, in a case where the character is given simple harmonic oscillation, the character is rendered in a position constituting a start point such as the center of the character. If the rendering destination is not included in the displacement target region (N in S16), the character is rendered in a reference position such as the center of the rendering destination region (S20). Preferably, in a first pass of rendering, the character targeted for displacement may also be rendered in a reference position similar to the one for the character not targeted for displacement. The character displacement controlling section 80 repeats the processes of steps S16 to S20 until all characters to be rendered in the display image by use of fonts have been rendered (N in S22).

When all characters have been rendered (Y in S22), the display image generating section 82 completes the display image by performing rendering with respect to other regions as needed and outputs the completed data to the display apparatus 16 via the output section 84 (S24). During the period in which the display need not be terminated due to, for example, the user's operations (N in S26), the processes of steps S12 to S24 are repeated. When it is time to end the display, the whole processing is terminated (Y in S26).

Incidentally, in a state in which the display image is stationary except for the characters being displaced, the processes of steps S12, S14, and S20 may be omitted where appropriate. Only the data of the region of the characters targeted for displacement may be updated in step S18.

According to the above-described embodiment, images such as characters in the display image are displaced or oscillated by a tiny amount smaller than the pixel region per frame in a manner making the lines of the characters easier to read through the use of the time integration capability of human visual perception. For example, the character fonts are made to correspond to the rules for displacing part or all of the lines of each character. The correspondence enables font-based flexible display while alleviating at the same time those reductions in the legibility or visibility of characters that are attributable to lowered resolution levels or reduced character sizes.

Further, depending on the need for displacement and on the velocity of displacement, the range of sampling in the font image is adjusted so as to determine the pixel value of the display image. The adjustments implement display in such a manner that the contours of the characters not targeted for displacement are blended with the background while the contours of the characters targeted for displacement are visually recognized clearly through time integration. Further, the target in which the character is to be displaced such as the region that includes the point of gaze is limited to the regions determined in accordance with predetermined criteria. In addition, whether or not to perform the character displacement processing is determined on the basis of at least one of illegibility-related criteria such as the resolution of the display apparatus, the size of characters on the screen, the user's eyesight, the distance to the screen, and the presence of swaying of the screen. These features prevent wastefulness resulting from needless displacement processing on the regions irrelevant to legibility and in situations unrelated thereto, and thereby minimize the increase in the processing load.

The present invention has been described above in conjunction with specific embodiments. It is to be understood by those skilled in the art that suitable combinations of the constituent elements and of various processes of the embodiments described above as examples will lead to further variations of the present invention and that such variations also fall within the scope of the present invention.

REFERENCE SIGNS LIST

8 Mobile terminal, 10 Image processing apparatus, 14 Input apparatus, 16 Display apparatus, 72 Input information acquiring section, 74 Display content acquiring section, 78 Font data storing section, 80 Character displacement controlling section, 82 Display image generating section, 84 Output section, 120 Point-of-gaze detecting section, 124 Target region determining section, 126 Character rendering section

INDUSTRIAL APPLICABILITY

As described above, the present invention may be applied to diverse types of information processing apparatuses such as an image display apparatus, an image reproduction apparatus, game machines, personal computers, and mobile terminals, as well as to information processing systems each including any one of such apparatuses.

The invention claimed is:

1. An image processing apparatus comprising:
a storage section configured to store data associating data of a source image to be displayed in a display image with predetermined displacement rules for the source image with respect to a display image plane;
a displacement controlling section configured to displace the source image in accordance with the displacement rules, before determining a pixel value of the display image on a basis of positional relations between the source image and the display image plane; and
an output section configured to output data of the display image of which the pixel value is determined, wherein at least one of:
(i) the storage section stores, as the displacement rules, rules for oscillation relative to the display image plane in association with the data of the source image, and the displacement controlling section oscillates the source image relative to the display image plane in accordance with the displacement rules,
(ii) depending on whether or not the source image is to be displaced, the displacement controlling section varies a shape of a range in the source image referenced for determining each pixel value of the display image, and
(iii) the displacement controlling section narrows the range in the source image referenced for determining each pixel value of the display image in a direction in which the source image is displaced.

2. The image processing apparatus according to claim 1, wherein the storage section stores, as the displacement rules, rules for causing one frame of the display image to produce a displacement smaller than a one-pixel region.

3. The image processing apparatus according to claim 1, wherein
the storage section stores data representing a font of a character as the data of the source image, in association with the displacement rules, and
the displacement controlling section displaces each character individually in the display image, in accordance with the displacement rules.

4. The image processing apparatus according to claim 3, wherein
the storage section stores, as part of the font of the character, data associating each of lines constituting the character with the displacement rules, and
the displacement controlling section displaces each of the lines individually in accordance with the displacement rules.

5. The image processing apparatus according to claim 1, wherein the displacement controlling section performs displacement in accordance with the displacement rules within a region of the display image selected according to predetermined criteria.

6. The image processing apparatus according to claim 1, wherein the displacement controlling section acquires information regarding a point of gaze of a user relative to the display image, before performing displacement in accordance with the displacement rules within a region of a predetermined range including the point of gaze.

7. The image processing apparatus according to claim 1, wherein the displacement controlling section determines whether or not to perform displacement in accordance with the displacement rules on a basis of at least a resolution of a display apparatus outputting the display image, a size of the source image relative to the display image plane, a distance between a screen of the display apparatus and a user, an eyesight of the user, or a velocity of the display apparatus.

8. A display image generating method by an image processing apparatus, the display image generating method comprising:
reading out data for generating a display image from a memory that stores data associating data of a source image with predetermined displacement rules for the source image with respect to a display image plane;
displacing the source image in accordance with the displacement rules, before determining a pixel value of the display image on a basis of positional relations between the source image and the display image plane; and
outputting data of the display image of which the pixel value is determined, wherein at least one of:
(i) the memory includes, as the displacement rules, rules for oscillation relative to the display image plane in association with the data of the source image, and the displacing includes oscillating the source image relative to the display image plane in accordance with the displacement rules,
(ii) depending on whether or not the source image is to be displaced, the displacing includes varying a shape of a range in the source image referenced for determining each pixel value of the display image, and
(iii) the displacing includes narrowing the range in the source image referenced for determining each pixel value of the display image in a direction in which the source image is displaced.

9. A non-transitory, computer-readable storage medium containing a computer program, which when executed by a computer, causes the computer to carry out actions, comprising:
reading out data for generating a display image from a memory that stores data associating data of a source image with predetermined displacement rules for the source image with respect to a display image plane;
displacing the source image in accordance with the displacement rules, before determining a pixel value of the display image on a basis of positional relations between the source image and the display image plane; and
outputting data of the display image of which the pixel value is determined, wherein at least one of:
(i) the memory includes, as the displacement rules, rules for oscillation relative to the display image plane in association with the data of the source image, and the displacing includes oscillating the source image relative to the display image plane in accordance with the displacement rules,
(ii) depending on whether or not the source image is to be displaced, the displacing includes varying a shape of a range in the source image referenced for determining each pixel value of the display image, and
(iii) the displacing includes narrowing the range in the source image referenced for determining each pixel value of the display image in a direction in which the source image is displaced.

10. A non-transitory, computer-readable storage medium containing a font data structure to be referenced by an image processing apparatus for rendering a character in a display image, wherein with respect to each character, data of an image representing a shape of the character that is arranged on a display image plane and whose pixel value at a corresponding position is referenced for determining the pixel values of the display image is associated with displacement rules representing the rules according to which the image processing apparatus displaces the arrangement, wherein at least one of:

(i) a memory includes, as the displacement rules, rules for oscillation relative to the display image plane in association with the data of the source image, and the displacing includes oscillating the source image relative to the display image plane in accordance with the displacement rules, (ii) depending on whether or not the source image is to be displaced, the displacing includes varying a shape of a range in the source image referenced for determining each pixel value of the display image, and (iii) the displacing includes narrowing the range in the source image referenced for determining each pixel value of the display image in a direction in which the source image is displaced.

\* \* \* \* \*